Figure 1:
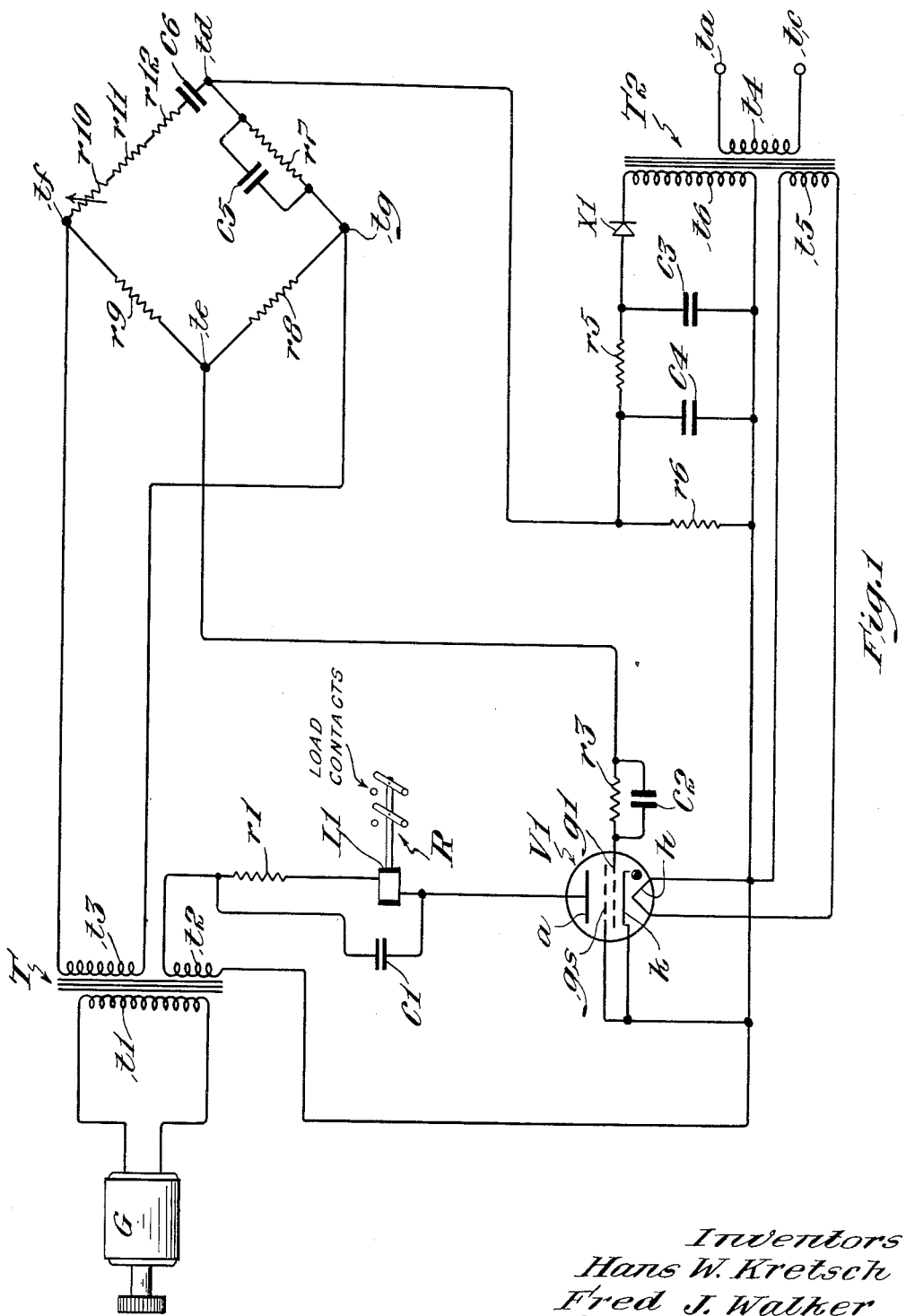
Figure 6:
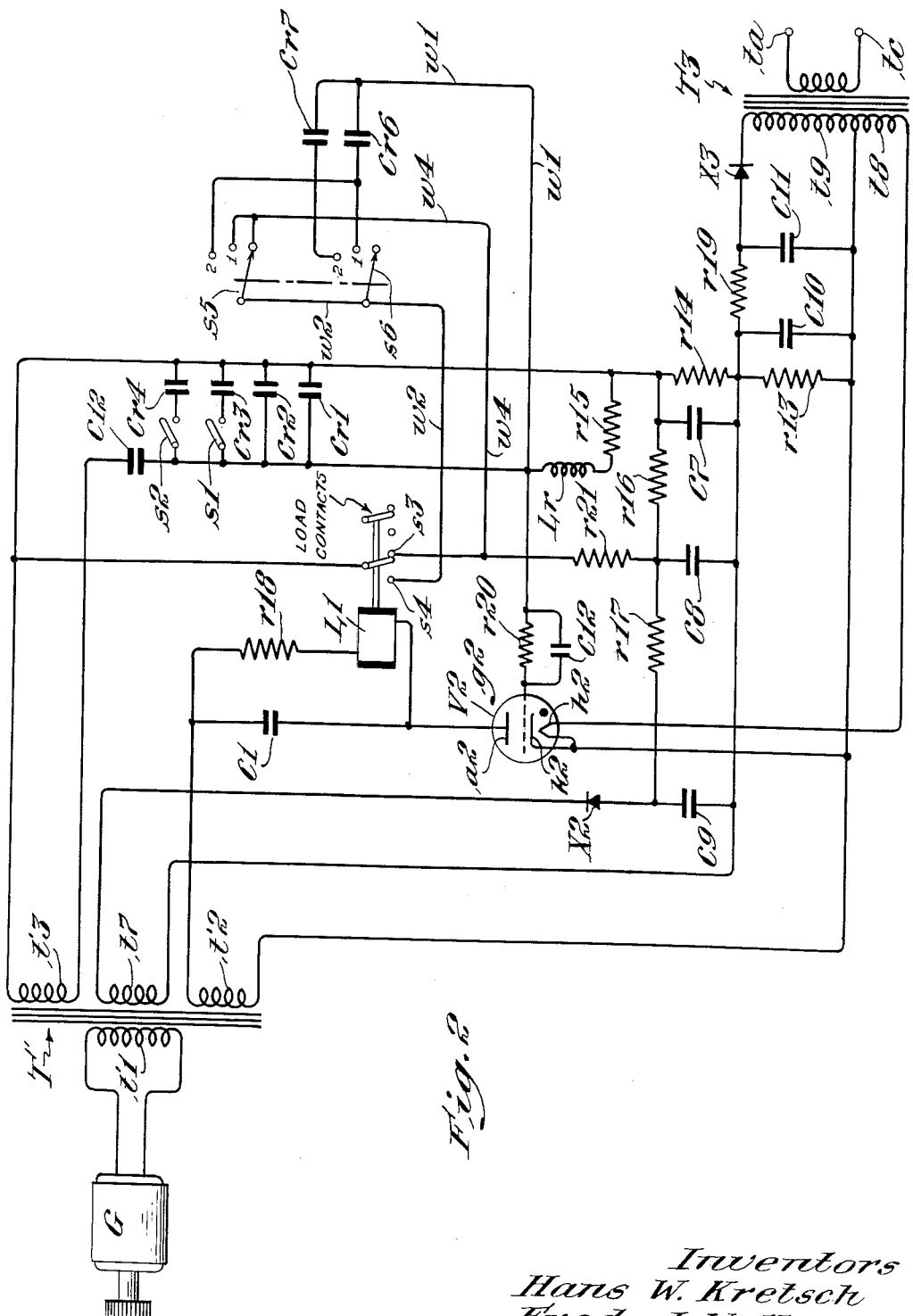

United States Patent Office 2,721,962
Patented Oct. 25, 1955

2,721,962
ELECTRONIC SPEED SWITCH

Hans W. Kretsch, Bridgeport, and Fred J. Walker, Milford, Conn., assignors to Manning, Maxwell & Moore, Incorporated, New York, N. Y., a corporation of New Jersey Application April 3, 1952, Serial No. 280,402

15 Claims. (Cl. 317—142)

This invention relates to speed responsive devices and more particularly to such devices as are electronically operated.

The use of electrical tachometers for determining rotational speeds is well known in the art, but applications of electrically operated speed control devices or governors are encountered less frequently because of the inherent simplicity of mechanical systems such as a fly ball governor whose output may be coupled directly to the speed regulating mechanism. However in applications such as those involving very high speeds or low torques, an electrical system, such as one using an A. C. tachometer generating a signal whose frequency is a function of its rotational speed, offers distinct advantages over present mechanical systems.

Objects of this invention are to provide a speed responsive device which will transfer one or more pairs of associate electrical load contacts at a preselected rotational speed; which eliminates mechanical contacts and brushes, which can be used at high speeds without the necessity of speed reducing gearing, which requires a minimum of operating torque, which can be used in conjunction with present electrical tachometers, which is particularly adapted for use on aircraft, whose operating speed can be readily adjusted, which uses standard electrical components, which is light in weight, which is rugged in construction, and which advances the art generally.

The invention for accomplishing the above objections contemplates a power source, such as an alternating current generator, the frequency of whose output is selectively variable, for example as a function of its operational speed. The output of the power source is impressed upon the anode and cathode of an electron discharge device, such as a thyratron, by means of a circuit including the solenoid for operating the load contacts of a control relay. A frequency discriminatory, phase shifting reactive control network, such as an alternating current bridge or a parallel inductance-capacitance circuit, is interposed between the output terminals of the power source and the grid control electrode of the thyratron, such that a branch of the network impresses on the grid a potential which is opposed to the normal biasing potential upon the electrode. The electrical characteristics of the network are made such that at a selected power source frequency value greater than the resonating frequency of the network, a voltage is impressed upon the control electrode which leads the anode potential so that the thyratron conducts during the greater portion of each cycle whereby the thus predetermined average alternating current energy flowing through the thyratron is sufficient to operate the relay.

These and other objects and aspects of the invention will be apparent from the following description of several specific embodiments of the invention which refer to drawings wherein:

Fig. 1 is a wiring diagram of an embodiment incorporating an alternating current bridge; and Fig. 2 is a wiring diagram of an embodiment incorporating a parallel inductance capacitance network.

As is shown in Fig. 1, the output from one phase of a power source, such as a tachometer generator G, which is preferably of the type used to measure the speed of an airplane engine, is connected to the primary winding $t1$ of a transformer T. One end of the secondary winding $t2$ is directly linked to the cathode $k$ and the screen grid $gs$ of an electron discharge device such as the thyratron tube V1. The other end of the secondary winding $t2$ is connected to the anode $a$ of the thyratron V1 by means of an anode circuit including a temperature compensating resistor $r1$ and the operating solenoid L1 of a relay R. A capacitor $c1$ is connected in parallel with the solenoid L1 and the resistor $r1$ to prevent chattering of the relay contacts.

A negative bias is impressed upon the grid control electrode $g1$ of the thyratron V1 by the voltage drop resulting from the current flow through a resistor $r6$ which voltage drop is impressed upon the grid by resistors $r7$, $r8$ and $r3$. A capacitor $c2$ is connected in parallel with the resistor $r3$ to form a time delay circuit whose function will be described in detail hereinafter. The current flowing through the resistor $r6$ is supplied from the terminals $ta$ and $tc$ of an alternating current supply (not shown) which when the apparatus is used in airplanes usually has a frequency of 400 C. P. S., but it is to be understood that the invention is not limited to such a frequency but can be used in conjunction with any conventional power supply by proper choice of the values of the circuit components. The terminals $ta$ and $tc$ connect respectively with the ends of the primary windings $t4$ of a transformer T2. One secondary winding T5 of the transformer T2 is used to energize the heater $h$ of the thyratron V1. The other secondary winding $t6$ is coupled by means of a rectifier X1 with a ripple filter consisting of two capacitors $c3$ and $c4$ separated by means of a resistor $r5$. A bleeder resistor $r6$ shunts the output of the filter. One end of the resistor $r6$ is directly coupled to the cathode $k$ of the thyratron. The other end of the resistor $r6$ is connected to one terminal $td$ of an alternating current bridge which will be described in detail hereinafter. The potential drop appearing across the bleeder resistor $r6$ impresses a negative bias upon the control electrode $g1$ of the thyratron V1. The bias and heater voltage have opposing effects on the firing frequency of the thyratron. Therefore by deriving these from the same source the circuit is made independent of changes in source voltage.

The secondary winding $t3$ of the transformer T is directly connected to the input terminals $tf$ and $tg$ of the above mentioned bridge which is preferably of the so-called "Wien" type wherein a capacitor $c5$ shunts the resistor $r7$ and the oppositely disposed arm or branch consists of a resistor $r9$. The bridge arm opposite the resistor $r8$ includes resistors $r10$, $r11$ and $r12$ which are connected in series with a capacitor $c6$ between the terminals $td$ and $tf$ and one of which, such as $r10$, is adjustable. As well known, bridges of the "Wien" type do not have a frequency at which their output goes to zero unless certain conditions are strictly satisfied. Adjustment of the bridge components such as by way of resistor $r10$ deliberately avoids these conditions so that a finite although minimum output exists at a frequency near that at which the phase shift passes through zero.

The frequency at which the bridge is balanced with its output near a minimum is varied by way of the adjustable resistor $r10$. When the frequency of the output of the generator G is the same as the preselected balance frequency of the bridge, the potential applied to the control electrode $g1$ of the thyratron V1 is 180 degrees out of phase with the potential upon the anode $a$ so that the thyratron does not conduct and the relay solenoid L1 is not energized. As the frequency of the generator G is increased above that of the balance frequency of the bridge, the control electrode potenial leads the anode potential by an angle of less than 180 degrees, such angle progressively decreasing with increasing generator frequency until a critical point is reached near the beginning of each positive half cycle of the anode potential at which the control electrode is sufficiently positive to fire the thyratron for the remainder of the positive half cycle. As the thryratron is fired near the beginning of the positive half cycles, the energy level resulting from the average current flow is high enough to energize the relay solenoid L1 so that the relay load contacts are transferred, the energy simultaneously stored in the capacitor c1 energizing the relay solenoid during the negative half cycles.

It will be apparent that frequencies of the generator G below the bridge balance frequency also result in a positive increase in the control electrode potential, but such potential lags the anode potential by less than 180 degrees so that the control electrode becomes positive near the end of each positive half cycle of anode potential. The energy level of the average current flow is therefore of too low a value to energize the relay solenoid L1 sufficient to transfer the load contacts which are connected in the control circuit of the speed regulating mechanism (not shown nor forming any part of the present invention).

In Fig. 2 is shown a second embodiment wherein the bridge network illustrated in Fig. 1 is replaced by a parallel inductance-capacitance network. The embodiment of Fig. 2 is also provided with compensation for variations in the voltage of the generator G and the alternating power supply connected to the terminals $ta$ and $tc$. Such compensation is provided by varying the bias upon the control electrode $g2$ of a thyratron V2. To this end resistors $r13$, $r14$ and $r15$, an inductive reactor $Lr$ and a resistor $r20$ are connected in series between the control electrode $g2$ and the cathode $k2$ of the thyratron V2. The reactor $Lr$ forms the inductive portion of an inductance-capacitance network described in detail below. The resistor $r15$ is connected in series with the reactor $Lr$ to compensate for changes in the "Q" of the network with variations in temperature.

To maintain the firing point of the thyratron V2 at substantially the same relative position in the cycle with changes in anode potential due to variations in the output voltage of the generator G, the control electrode potential is varied inversely by obtaining a portion of the biasing voltage from the generator so that the bias varies as a function of the generator output. To this end the bias upon the thyratron V2 is in part determined by the voltage drop across the resistor $r14$ which is also the bleeder connected across a filter network consisting of three capacitors $c7$, $c8$ and $c9$ separated by resistors $r16$ and $r17$. The input to the filter network is connected by means of a rectifier X2 to the secondary winding $t7$ of a transformer T' whose primary winding $t'1$ is coupled to one phase of the tachometer generator G. The ends of another secondary winding $t'2$ of the transformer T' are connected respectively to the anode $a2$ and cathode $k2$ of the thyratron V2 by means of a circuit including the relay solenoid L1 and its temperature compensating resistor $r18$. The capacitor $c1$ is connected in parallel with the relay solenoid L1 and the resistor $r18$ to prevent chattering of the relay contacts.

Variations in the power supply voltage for the heater $h2$ obtained from the secondary winding $t8$ of the transformer T3 are compensated for by connecting another secondary winding $t9$ across the resistor $r13$ by means of a rectifier X3 and a filter consisting of two capacitors $c10$ and $c11$ separated by a resistor $r19$ so that a bias for the thyratron control electode which varies as a function of the power supply appears across the resistor $r13$.

The above-mentioned inductance-capacitance network also includes two capacitors $Cr1$ and $Cr2$, which are connected in parallel with the reactor $Lr$ and its temperature compensating resistor $r15$. Additional capacitors $Cr3$ and $Cr4$ can be selectively connected in parallel with the capacitors $Cr1$ and $Cr2$ by means of switches $s1$ and $s2$ respectively to vary the resonant frequency of the network. The inductance capacitance network is energized from the secondary winding $t'3$ of the transformer T', through a series capacitor $c12$ which prevents drop-out of the relay at high frequencies due to the symmetrical shape of the network. The common junction of the reactor $Lr$ and the capacitor $Cr1$ is coupled to the control electrode $g2$ of the thyratron V2 by means of the resistor $r20$ which has connected in parallel therewith a capacitor $c12$ to form a time delay circuit whose function will be described in detail hereinafter.

One pair of normally closed contacts $s3$ of the relay connects a resistor $r21$ in parallel with the resistor $r16$ so that the voltage drop across the resistor $r14$ and therefor the bias upon the thyratron V2 is decreased subsequent to the firing thereof and the resulting operation of the relay which causes the opening of the contacts and the disconnecting of the resistor $r21$ from the circuit. The above described operation of the relay has the effect of maintaining the firing of the thyratron at high frequencies at which the impedance of the inductance capacitance network approaches the critical point where the voltage upon the control electrode is insufficient for continued positive firing of the thyratron.

The electrical characteristics of the above circuit can be modified to change the frequencies at which the relay is energized and drops out respectively by means of two multiposition switches $s5$ and $s6$ which are mechanically interlinked so as to be operable conjointly.

In the positions of the switches $s5$ and $s6$ designated #1, the resistor $r21$ is connected in parallel with resistor $r16$ in the energized position of the relay by means of a circuit including a conductor $w4$ which links the #2 terminal of the switch $s5$ with the common junction of the resistor $r21$ and the normally closed contact $s3$ of the relay, the switch $s5$, the conductor $w2$ which extends to the normally open relay contact $s4$ and the movable relay contact to the common junction of the resistors $r14$ and $r16$. As the resistor $r21$ is connected in parallel with the resistor $r16$ in the normal or de-energized position of the relay by means of the circuit including the normally closed contacts $s3$ described in detail heretofore, the bias upon the thyratron V2 is maintained the same irrespective of the condition of the relay when the switches $s5$ and $s6$ are in the #1 position. The terminal of the #1 position of the switch $s6$ is connected to one terminal of a capacitor $Cr6$ whose other terminal is linked by means of the conductor $w1$ to the common junction of the reactor $Lr$ and the capacitor $Cr1$ so that transferring of the contacts upon the energizing of the relay connects the capacitor $Cr6$ in parallel with the capacitors $Cr1$ to $Cr4$ by a circuit including the conductor $w1$, the capacitor $Cr6$, the switch $s6$ and the normally open relay contacts $s4$. The addition of capacitance in the network after the energizing of the relay, as described above, lowers the resonant frequency so that the preselected frequency at which the relay is de-energized is materially lower than the original resonating frequency. It is to be understood that the above described circuit associated with the switch position #1 can be duplicated with other capacitors having different values and corresponding switch positions thereby to further extend the range.

In the positions designated #2, the switches $s4$ and $s6$ connect the above-mentioned capacitor $Cr6$ in parallel with a capacitor $Cr7$ so that the closing of the relay contacts $s4$ connects the capacitors in parallel with the capacitors $Cr1$ to $Cr4$ thereby to add further capacitance to the parallel capacitance-inductance network subsequent to the firing of the thyratron thus lowering the frequency at which the relay drops out.

Fundamentally the operation of the circuit shown in Fig. 2 is similar to that of the circuit shown in Fig. 1, which was described in detail heretofore, i. e. when the frequency of the generator voltage rises above the resonant frequency of the parallel-inductance capacitance network, the phase of the potential impressed upon the control electrode by the network leads the potential impressed upon the anode so that the tube fires near the beginning of each positive anode voltage cycle. As was also discussed in detail heretofore, the voltage drops across the thyratron biasing resistors $r13$ and $r14$ vary as functions of the heater and generator voltages respectively so that the effect of changes of such voltages upon the firing point of the thyratron is minimized. The effect of the operation of the relay and the multiposition switches $s5$ and $s6$ upon the frequencies at which the relay is energized and de-energized has also been discussed in detail above.

The parallel combination of the resistor $r3$ and the capacitor $c2$ in the control electrode circuit of the thyratron in Fig. 1, and the parallel combination of the resistor $r20$ and the capacitor $c12$ in the control electrode circuit of the thyratron in Fig. 2 have time constants which averages the control electrode currents that flow when the thyratrons conduct. Each current is proportional to the anode current so that as the anode current begins to flow the regenerative feed back resulting from the averaging action of the parallel resistor-capacitor combination causes the anode current substantially instantaneously to build up to its maximum value thus causing the current to reach the value required to operate the relay in a very short time and making the circuit substantially independent of the characteristics of the relay.

It should be understood that the present disclosure is for the purpose of illustration only and that this invention includes all modifications and equivalents which fall within the scope of the appended claims.

We claim:

1. A regulating device responsive to deviation from a selected output frequency value of a variable frequency alternating current source, comprising: an electron discharge device having a cathode and an anode connected in a circuit containing the output terminals of said source, and a control electrode; connected to said source a frequency discriminatory control network having control output terminals which present a control potential whose phase shifts relatively to the phase of the source potential upon deviation of the source frequency from said selected value; and means for connecting said control output terminals between said cathode and said control electrode; whereby the phase of said control potential can be made to oppose the phase of said source approximately at said selected frequency value, and the energy flow in the cathode-anode circuit can be controlled upon such deviation by the change of the control electrode potential causing it to fire when said control potential shifts from phase opposition.

2. Device according to claim 1 wherein said control network includes means for shifting said phase of said control potential in leading relation to said source frequency in response to an increase of the source frequency.

3. Device according to claim 1 further comprising potentiometer means for applying a negative bias potential to said control electrode, said control network including means for superimposing said control potential on said bias potential.

4. Device according to claim 3, further comprising a control relay responsive to a predetermined value of energy flow in said cathode anode circuit and having normally closed auxiliary contacts, and a resistor connected through said auxiliary contacts in parallel to said potentiometer means, whereby the biasing voltage drop across the potentiometer means is decreased upon response of the control relay to prevent the relay from dropping out at high output frequencies of the alternating current source.

5. Device according to claim 3, further comprising a time delay circuit inserted between said potentiometer means and said control electrode, for averaging the potential of the control electrode when the electron discharge device conducts so that the anode current builds up substantially instantaneously.

6. Device according to to claim 3, wherein said potentiometer means includes parallel connected capacitor and resistor means for averaging the current flow when the electron discharge device conducts so that the anode current builds up substantially instantaneously.

7. Device according to claim 1 wherein said frequency discriminatory control network includes an impedance having a minimum output at a frequency near the frequency at which the output phase shift passes through zero.

8. Device according to claim 1 wherein said control network includes an inductance-capacitance circuit having a predetermined resonant frequency.

9. Device according to claim 8, further comprising a control relay responsive to a predetermined value of energy flow in said cathode anode circuit, and having a compensating capacitor and in series thereto normally open contact means adapted to be closed upon response of said control relay for connecting said compensating capacitor in parallel to the capacitance means of said circuit, thereby to increase the resistance of said capacitance means when the relay responds to the electron discharge device.

10. Device according to claim 1 further comprising means for applying a bias potential to said control electrode in opposition to said control potential, and means for superimposing on said bias potential a voltage drop which varies as a function of the output voltage of said alternating current source, thereby to change the bias for minimizing variations of said energy flow due to changes in anode voltage rather than frequency variation of the source.

11. Device according to claim 1 further comprising biasing means for said control electrode which include a resistor between cathode and control electrode and rectifying means supplied by said alternating current source for applying a negative bias potential to said resistor and said control electrode.

12. Device according to claim 1 further comprising a heater for said cathode and biasing means for said control electrode, said biasing means including a biasing resistor between cathode and control electrode and means for applying across the biasing resistor a voltage drop which varies as a function of the heater voltage in the sense such as to minimize variations of the effective biasing potential due to change of heater voltage.

13. A regulating device responsive to deviation from a selected output frequency value of a variable frequency alternating current source, comprising: an electron discharge device having a cathode and an anode connected in a circuit containing the output terminals of said source, and a control electrode; a control relay connected in said cathode-anode circuit responsive to a predetermined energy flow and having normally closed auxiliary contacts; potentiometer means for applying a bias potential to said control electrode; a resistor connected through said auxiliary contacts in parallel to said potentiometer means; connected to said source a frequency discriminatory control network having control output terminals which present a control potential whose phase shifts relatively to the phase of the source potential upon deviation of the source frequency from said selected value; and means connecting said control output terminals between said cathode and said control electrode for superimposing said control potential on said bias potential; whereby the phase of said control potential can be made to oppose the phase of said source approximately at said selected frequency value, the energy flow in the cathode-anode circuit can be controlled upon said deviation by the increase of the control electrode potential causing it to fire when said control potential shifts from phase opposition, and the biasing voltage drop across the potentiometer means is decreased upon response of the control relay to prevent the relay from dropping out at increased output frequency of the source.

14. A regulating device responsive to deviation from a selected output frequency value of a variable frequency alternating current source, comprising: a gas filled electron discharge device having a cathode and an anode connected in a circuit containing the output terminals of said source, and a negatively biased control electrode; connected to said source terminals a bridge network having between said source terminals two resistor branches on either side of one bridge output terminal, and having between said source terminals a branch with an adjustable resistor and a capacitor in series on one side of a second bridge output terminal, and a branch with a resistor and a capacitor in parallel on the other side of said second bridge output terminal, said resistors and capacitors being mutually adjusted to furnish a minimum output at a source terminal frequency near the frequency at which the phase shift at said output terminals passes through zero; and means for connecting said bridge output terminals between said cathode and said control electrode; whereby the phase of said bridge output terminals can be made to oppose the phase of said source approximately at said selected output frequency value, for controlling the energy flow in the cathode-anode circuit by the shift of the bridge output phase upon such deviation.

15. A regulating device responsive to deviation from a selected output frequency value of a variable frequency alternating current source, comprising: a gas filled electron discharge device having a cathode and an anode connected in a circuit containing the output terminals of said source, and a negatively biased control electrode; connected to said source terminals an inductance-capacitance network which is resonant approximately at said selected output frequency value and has control output terminals presenting at said selected output frequency a phase approximately in opposition to that of said current source; and means for connecting said control output terminals between said cathode and said control electrode; whereby the phase presented by said control output terminals can be made to oppose the phase of said source approximately at said selected output frequency value, for controlling the energy flow in the cathode-anode circuit by the shift of the network output phase upon such deviation.

References Cited in the file of this patent

UNITED STATES PATENTS

| | | |
|---|---|---|
| 2,224,602 | Kaufmann | Dec. 10, 1940 |
| 2,545,223 | Briggs | Mar. 13, 1951 |
| 2,563,179 | Malsbary | Aug. 7, 1951 |
| 2,564,596 | Dahline | Aug. 14, 1951 |
| 2,573,035 | Long | Oct. 30, 1951 |